P. AND B. DE MATTIA.
TIRE BUILDING CORE AND CHUCK.
APPLICATION FILED JAN. 30, 1919.
1,323,164.
Patented Nov. 25, 1919.
2 SHEETS—SHEET 1.
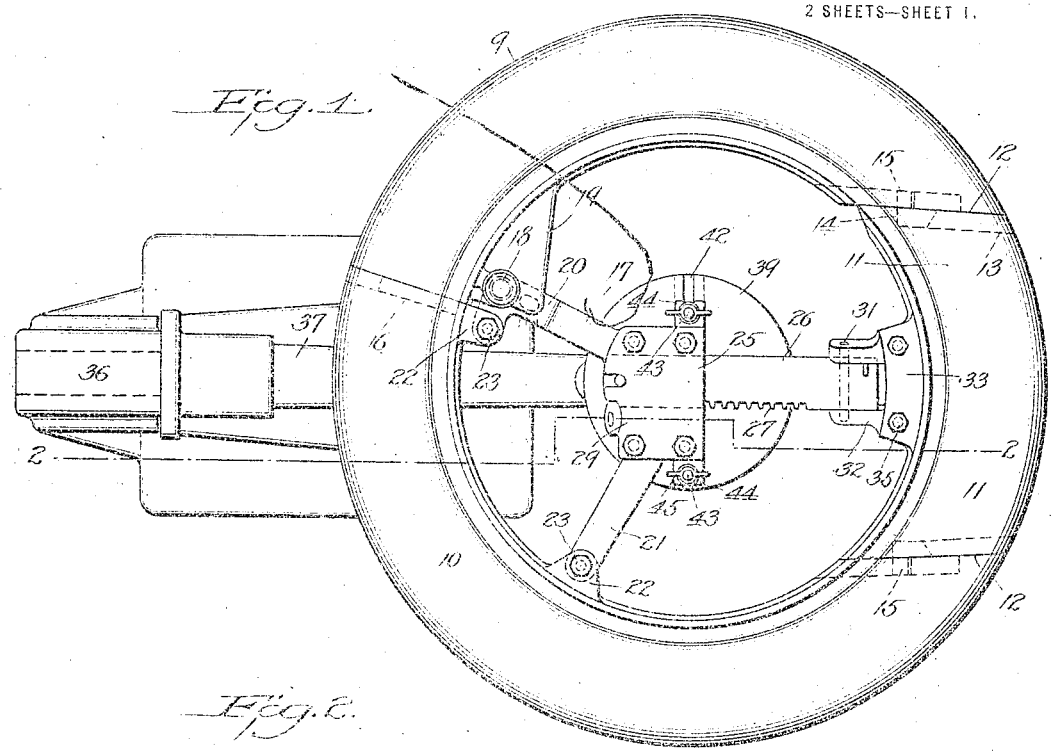
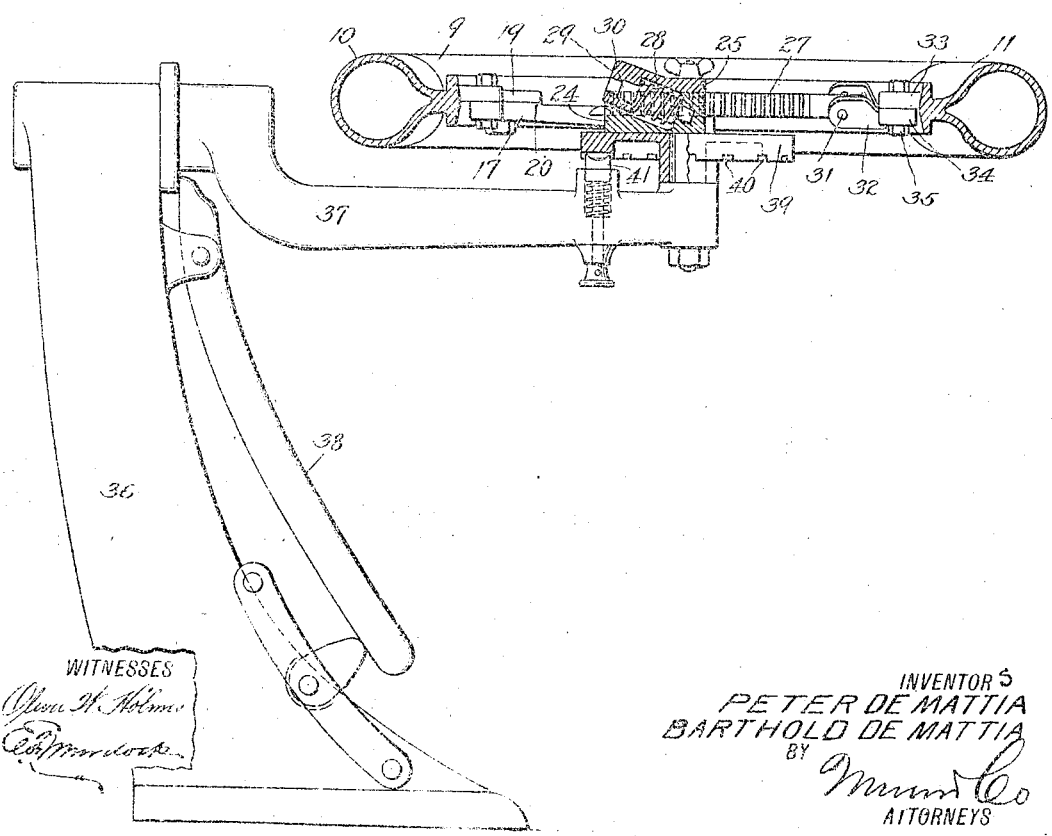
WITNESSES
INVENTORS
PETER DE MATTIA
BARTHOLD DE MATTIA
BY
ATTORNEYS

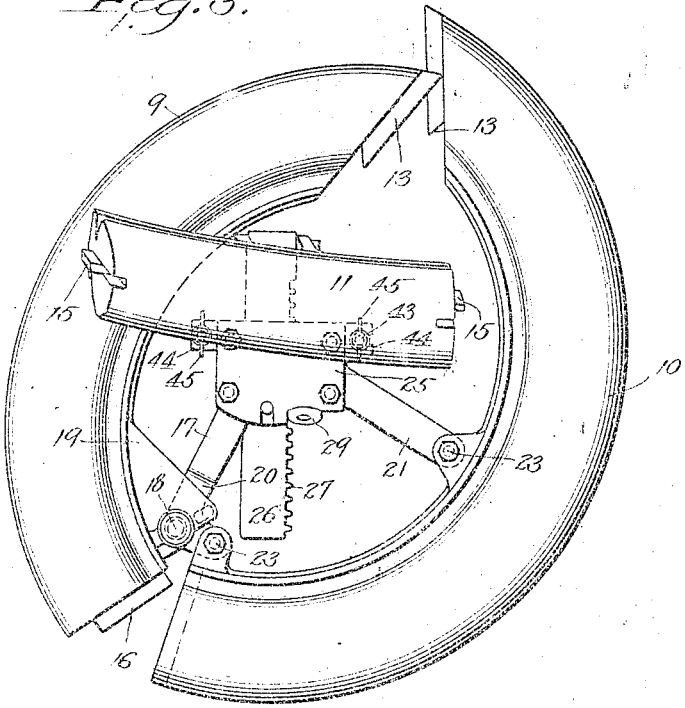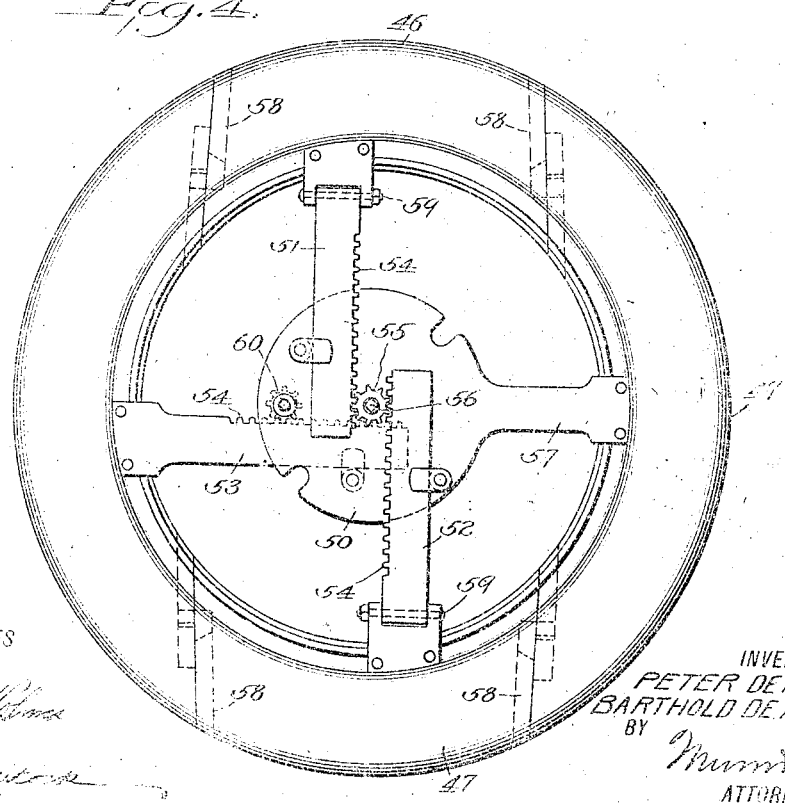

UNITED STATES PATENT OFFICE.

PETER DE MATTIA AND BARTHOLD DE MATTIA, OF CLIFTON, NEW JERSEY.

TIRE-BUILDING CORE AND CHUCK.

1,323,164.  Specification of Letters Patent.  Patented Nov. 25, 1919.

Application filed January 30, 1919. Serial No. 274,014.

*To all whom it may concern:*

Be it known that we, PETER DE MATTIA and BARTHOLD DE MATTIA, both citizens of the United States, and residents of Clifton, in the county of Passaic and State of New Jersey, have invented a new and improved Tire-Building Core and Chuck, of which the following is a full, clear, and exact description.

The present invention relates to a tire building core and chuck of that type embodying a collapsible core and it has for its object, to facilitate the stripping or removal of the tire shoe from the core and to provide means whereby the supporting chuck may be adapted for use with cores varying in external diameter. A further object is to so construct the collapsible core that the movement of the movable sections thereof will be substantially free of interference of the sections with each other.

The present invention is shown in the accompanying drawings in which—

Figure 1 shows a top plan view of a sectional core in extended relation and mounted upon a stand or jack ready for use.

Fig. 2 shows a vertical section through the collapsible core and chuck with the stand or jack in side elevation.

Fig. 3 shows a top plan view of the collapsible core and chuck removed from the jack and with the parts collapsed.

Fig. 4 is a top plan view showing a collapsible core formed of four sections.

Similar reference characters will be employed throughout the specification and drawing to designate corresponding parts.

The core as shown in Figs. 1, 2 and 3 is composed of three sections, 9, 10 and 11, the sections 9 and 10 coöperating with a relatively short section 11, hereinafter referred to as the key section, to complete the annular or circular core, and as clearly shown in Fig. 1, each of the said sections is formed as a segment of the circle.

The ends of the key section 11 and the ends of the sections 9 and 10 adjacent to and abutting against the ends of the key section 11, meet upon lines which are slightly divergent from the outer to the inner periphery, forming the necessary draft surfaces 12 whereby the key section may be readily moved into and out of position between the ends of the sections 9 and 10.

As shown in the drawing, the key section 11 carries at its opposite ends tenons 13 and 14, each provided with an extension 15 arranged to engage a groove in the ends of sections 9 and 10, forming a stop to limit the outward movement of the key section 11 and to lock the ends in registering position.

The section 9 at its opposite end has a tenon 16 which enters the slot or groove formed in the end of section 10.

The section 9 is pivotally supported on an arm 17 of the chuck by means of the pivot 18, which passes through a web 19 formed integrally with section 9 and which rests upon a guiding and supporting surface 20 on the arm 17, the arrangement being such that the section 9 may be moved about the pivot 18 in the plane of the section into and out of operative position, as shown in Figs. 1 and 3 of the drawings.

The arm 17 and another fixed bracket arm 21, also forming part of the chuck, support the fixed section 10, which is provided with inwardly projecting lugs 22 secured by means of bolts 23 to the arms 17 and 21. These arms 17 and 21 project from a plate 24. A covering plate 25 is bolted to the plate 24 and the inner faces of plates 24 and 25 are grooved to form a slot or guide for a sliding bracket arm 26. The bracket arm 26 along one edge is provided with rack teeth 27, which are engaged by a short worm 28 mounted in bearings in the housing 29 of the cover plate 25. At its upper end the worm is provided with a wrench socket 30, or otherwise formed to connect with a suitable tool whereby the worm may be turned and by its engagement with the rack teeth 27, advance or retract the sliding bracket arm 26.

The key section 11 is pivotally connected to the bracket arm 26, as by means of the pivot pin 31 engaging ears 32 projecting from the block 33 carried upon the inner periphery of the key section 11. Preferably, the ears 32 are formed integrally with a bridge plate 34 which is bolted by means of of bolts 35 to the undersurface of the block 33. The ears 32 are angularly disposed with relation to the plane of the key section so that pivot 31 will be similarly angularly disposed whereby, as the key section 11 is turned about the pivot 31, its upper end as the apparatus is viewed in Fig. 1, will be lifted or tilted upwardly so that freedom of movement will be provided for the swinging or pivotal section 9.

The chuck formed by the plates 24 and 25 and the bracket arms is removably connected with the segmental sections of the core so that it may be used with cores varying in external diameter, it being common to provide cores varying in external diameter, but the internal diameter being preserved, then the chuck may be provided with cores of varying size. In operation, the cores are used on a suitable jack or support, comprising a pedestal 36, which at its upper end pivotally supports a horn 37 which is engaged by a brake lever 38 to hold the horn in any position to which it may be moved about its pivotal axis in the upper end of the pedestal 36. The horn 37 at its outer end supports a pivoted table 39, which upon its underside is provided with a notched rim 40 arranged to be engaged by a spring-pressed pawl 41. The chuck is preferably detachably connected to the table 39 whereby it may either be removed therefrom or adjusted thereon, and for this purpose the table is provided with radially disposed undercut slots 42 into which the heads of the clamping bolts 43 extend. The bolts 43 project through the slots above the table and engage slotted lugs 44 carried by the chuck, the parts being held together by means of winged nuts 45 engaging the upper ends of the bolts 43.

In the operation of building a tire the sections are adjusted so as to form a complete annular core as shown in Fig. 1, whereupon the chuck is secured to the turn-table 39 by the bolts 43 and nuts 45. The prepared fabric is then laid on and stitched down, as usual in manufacturing tire shoes. After the shoe has been built up and while the rubber is yet in a raw state, it is removed from the core, which is accomplished by retracting the arm 26, thus withdrawing the key section 11 from the tire shoe and from its position between the ends of the sections 9 and 10. When withdrawn, the key section 11 is swung about its pivot 31 to the position shown in Fig. 3. Thereafter, the pivoted section 9 is swung about its pivot 18 to the position shown in Fig. 3, partially withdrawing it from the tire shoe, after which it is relatively simple to remove the tire shoe from the fixed section 10.

In Fig. 4 of the drawings a modified form of the apparatus is shown, in which the core is formed of four sections, 46, 47, 48 and 49. In this form the sections 46, 47 and 48 are movable by means of the arms 51, 52 and 53, forming a part of the chuck. Section 49 is carried by an arm 57 extending from the chuck plate 50. Each of the arms 51, 52 and 53 is provided with rack teeth along one edge, as shown at 54, the teeth on the arms 51 and 52 engaging a pinion 55, while the teeth 54 of the arm 53 engage a pinion 60, both of said pinions being arranged to be turned by any suitable means to retract and advance the radially disposed arms 51, 52 and 53, the arms being held to the plate 50 and guided thereon by any suitable means. The sections 46 and 47 are pivotally connected to the arms 51 and 52 by means of the pivot bolts 59. The meeting ends of the sections may be provided with complementary grooves and tenons 58. In the operation of the modified form the pinion 55 will be first rotated to simultaneously retract the sections 46 and 47, after which these sections may be turned about their pivots, whereupon the pinion 60 may be operated to retract the section 48. The pinions 55 and 60 may be provided with suitable tool engaging means, such as a polygonal head 56, whereby they may be rotated by a suitable tool or wrench.

Having described our invention, we claim:

1. A collapsible core, comprising a plurality of segmental core sections, one of said sections being movable in its own plane toward and from another of said sections, and another of said sections constituting a key section fitted between the ends of two adjacent sections and pivotally mounted to swing at an angle to the plane of the core.

2. A collapsible core, comprising a plurality of segmental core sections, one of said sections being movable in its own plane toward and from another of said sections and a key section fitted between the ends of two adjacent sections and movable with relation thereto in two directions at an angle to each other.

3. A collapsible core, comprising a plurality of segmental core sections, a support therefor, one of said sections constituting a key section fitted between the ends of two adjacent sections, a movable carrier for said key section and a pivotal connection between said carrier and said key section.

4. In combination, a plurality of segmental core sections, a support therefor, one of said sections being pivotally connected to said support for movement in its own plane toward and from another section, and another of said sections constituting a key section, a support therefor, and means to move said support to advance and retract the key section.

5. In combination, a plurality of segmental core sections, complementary interlocking connections between the ends of said sections, a support for said sections, one of said sections constituting a key section, and means for retracting and advancing the key section and an angularly disposed pivot connecting the key section to its support.

6. In combination, a collapsible core, comprising a plurality of segmental core sections, a supporting and operating chuck carrying such sections, a jack, a revolving table carried by said jack and means to detachably connect the chuck to said table.

7. A collapsible core, comprising a plurality of segmental sections, one of said sections being pivotally connected to swing in the plane of the core and another of said sections being pivotally connected to swing out of the plane of said core.

8. A collapsible core, comprising a plurality of segmental sections, one of said sections being pivotally connected to swing in the plane of said core and another of said sections being pivotally connected to swing in a plane approximately perpendicular to the plane of said core.

9. In combination, a collapsible core, comprising a plurality of segmental core sections, an operating chuck carrying such sections, a jack and means for detachably connecting the chuck to said jack.

10. A collapsible core, comprising a plurality of segmental sections, one of said sections being a key section, means to move said key section into and out of operative position and sliding complementary interlocking connections carried by the ends of the key section and the abutting ends of adjacent sections.

11. In combination, a chuck, a collapsible core embodying segmental sections carried by said chuck, means for uniting the meeting ends of said sections rigidly in operative position and means for collapsing said sections.

12. In combination, a collapsible core, comprising a plurality of segmental sections, a chuck supporting said segmental sections and a detachable connection between said chuck and said sections.

PETER DE MATTIA.
BARTHOLD DE MATTIA.